(12) United States Patent
Kao et al.

(10) Patent No.: US 6,862,678 B1
(45) Date of Patent: Mar. 1, 2005

(54) APPARATUS AND METHOD FOR DATA PROCESSING USING MULTIPLY-ACCUMALATE INSTRUCTIONS

(75) Inventors: Min-Cheng Kao, Taipei (TW); Ching-Jer Liang, Hsinchu Hsien (TW); Calvin Guey, Taipei Hsien (TW)

(73) Assignee: Faraday Technology Corp., Hsinchu (TW)

( * ) Notice: Subject to any disclaimer, the term of this patent is extended or adjusted under 35 U.S.C. 154(b) by 458 days.

(21) Appl. No.: 09/709,800

(22) Filed: Nov. 9, 2000

Related U.S. Application Data
(60) Provisional application No. 60/212,954, filed on Jun. 21, 2000.

(51) Int. Cl.[7] ................................................. G06F 7/52
(52) U.S. Cl. ....................................................... 712/221
(58) Field of Search ........................... 712/221; 708/490

(56) References Cited

U.S. PATENT DOCUMENTS

| | | | |
|---|---|---|---|
| 5,319,588 A | * | 6/1994 | Haines et al. ................ 708/552 |
| 5,583,804 A | | 12/1996 | Seal et al. |
| 6,370,640 B1 | * | 4/2002 | Dowling ....................... 712/228 |
| 6,581,086 B1 | * | 6/2003 | Morrison et al. ........... 708/523 |

* cited by examiner

*Primary Examiner*—Eddie Chan
*Assistant Examiner*—Barry O'Brien
(74) *Attorney, Agent, or Firm*—J.C. Patents

(57) ABSTRACT

An apparatus and a method of data processing system that uses multiply-accumulate instructions. The apparatus for processing data includes, a special register bank of N-bit data processing registers, a general register bank of N-bit data processing registers, a selector, a multiplier and an accumulator. The selector is coupled to the special register bank and the general register bank and is used for selecting one of the special and general register banks and outputting N-bit data from the selected register banks. The outputted N-bit data and the N-bit data held in the general register bank form a 2N-bit addition operand. The multiplier is used for performing multiply operation upon a first operand and a second operand and outputting an 2N-bit result. The accumulator is coupled to the multiplier, the selector and the general register bank and is used for performing accumulate operation upon the 2N-bit result and the 2N-bit addition operand and outputting a 2N-bit accumulated result.

14 Claims, 2 Drawing Sheets

APPARATUS AND METHOD FOR DATA PROCESSING USING MULTIPLY-ACCUMALATE INSTRUCTIONS

CROSS-REFERENCE TO RELATED APPLICATION

This application claims the priority benefit of provisional application Ser. No. 60/212,954, filed Jun. 21, 2000, the full disclosure of which is incorporated herein by reference.

BACKGROUND OF THE INVENTION

1. Field of Invention

The present invention relates to an apparatus and a method of data processing, system. More particularly, the present invention relates to an apparatus and a method of data processing system that uses multiply-accumulate instructions. The data processing system can easily detect an overflow case and simplify calculations to save execution time.

2. Description of Related Art

In the field of data processing, it is necessary to be able to perform certain operations upon operands stored in various data registers. One such operation is to multiply an N-bit operand by a second N-bit operand and add a third N-bit operand to the result. Another similar operation is to multiply an N-bit operand by a second N-bit operand and add a 2N-bit operand to the result.

FIG. 1 is a block diagram showing a conventional multiply-accumulator unit for a data processing system in U.S. Pat. No. 5,583,804, titled "DATA PROCESSING USING MULTIPLY-ACCUMULATE INSTRUCTIONS". This system is capable of performing a first class of multiply-accumulate instructions in the form of N*N+2N→2N, and a second class of multiply-accumulate instructions in the form of N*N+N→N.

The multiply-accumulator unit comprises a first data register 10, a second data register 20, an N*N multiplier 30, an N+N accumulator 40, and a 2N+2N accumulator 50. The multiplier 30 is capable of calculating N*N to get an N or a 2N result. The N+N accumulator 40 is capable of calculating N+N to get an N result. The 2N+2N accumulator 50 is capable of calculating 2N+2N to get a 2N result.

However, it is possible while performing an operation on an N*N+N→N class instruction, that the final N result is greater than can be represented in a result of N-bit size. It is important when this situations happens, that the user be made aware that an overflow condition has occurred in the operation. A disadvantage of the multiply-accumulator unit of FIG. 1 is the unit's inability to show this overflow condition. To provide this critical information to the user in as efficient manner as possible is one reason the multiply-accumulator unit of the present invention was developed.

SUMMARY OF THE INVENTION

Accordingly, an object of the present invention is to provide a data processing system comprising a single accumulator and capable of detecting overflow conditions and capable of performing multiply-accumulate instructions. Hence, system architecture is simplified and at the same time, valuable overflow information is provided. The data processing system can easily detect an overflow case and simplify calculations to save execution time.

To achieve these and other advantages and in accordance with the purpose of the invention, as embodied and broadly described herein, the invention provides an apparatus for processing data, the apparatus comprising a first register bank of N-bit data processing registers, a second register bank of N-bit data processing registers, a selector, a multiplier and an accumulator. The selector is coupled to the first register bank and the second register bank and is used for selecting one of the first and second register banks and outputting N-bit data from the selected register banks. The outputted N-bit data and the N-bit data held in the second register bank form a 2N-bit addition operand. The multiplier is used for performing multiply operation upon a first operand and a second operand and outputting an 2N-bit multiplied result. The accumulator is coupled to the multiplier, the selector and the second register bank and is used for performing accumulate operation upon the 2N-bit multiplied result and the 2N-bit addition operand and outputting a 23N-bit accumulated result.

In the apparatus for processing data, the selector is further used for receiving a class signal, wherein the selector selects one of the first and second register banks in response to the class signal.

The class signal of the above-mentioned apparatus for processing data is used for indicating a first class of instruction or a second class of instruction.

The apparatus for processing data further comprises a detecting device, coupled to the accumulator, for receiving the 2N-bit accumulated result and for checking if a case of overflow occurs.

In the apparatus for processing data, the outputted N-bit data from the selector and the N-bit data held in the second register bank are formed in combination as a first N-bit part and a second N-bit part of the 2N-bit addition operand, the accumulated result includes a third N-bit part and a forth N-bit part, when the class signal is the second class of instruction, the detecting device comparing the first N-bit part of the 2N-bit addition operand and the third N-bit part of the accumulated result to determine if the case of overflow occurs.

To achieve these and other advantages and in accordance with the purpose of the invention, as embodied and broadly described herein, the invention provides a method for processing data using an apparatus having a first register bank of N-bit data processing registers, a second register bank of N-bit data processing registers, a selector, a multiplier and an accumulator, the method comprising selecting one of the first and second register banks and outputting N-bit data from the selected register banks, wherein the outputted N-bit data and the N-bit data held in the second register bank form a 2N-bit addition operand; performing multiply operation upon a first operand and a second operand and outputting an 2N-bit multiplied result; performing accumulate operation upon the 2N-bit multiplied result and the 2N-bit addition operand and outputting a 2N-bit accumulated result.

In the above-mentioned method for processing data, the step of selecting one of the first and second register banks and outputting N-bit data from the selected register banks further comprising a step of receiving a class signal is determined by a class signal received by the selector.

The class signal is used for indicating a first class of instruction or a second class of instruction.

In the above-mentioned method for processing data further comprises a step of receiving the 2N-bit accumulated result and checking if a case of overflow occurs.

In the above-mentioned method for processing data, the outputted N-bit data from the selector and the N-bit data held in the second register bank are formed in combination as a first N-bit part and a second N-bit part of the 2N-bit addition operand, the accumulated result includes a third N-bit pant and a forth N-bit part, when the class signal is the second class of instruction, comparing the first N-bit part of the 21N-bit addition operand and the third N-bit part of the accumulated result to determine if ite case of overflow occurs.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
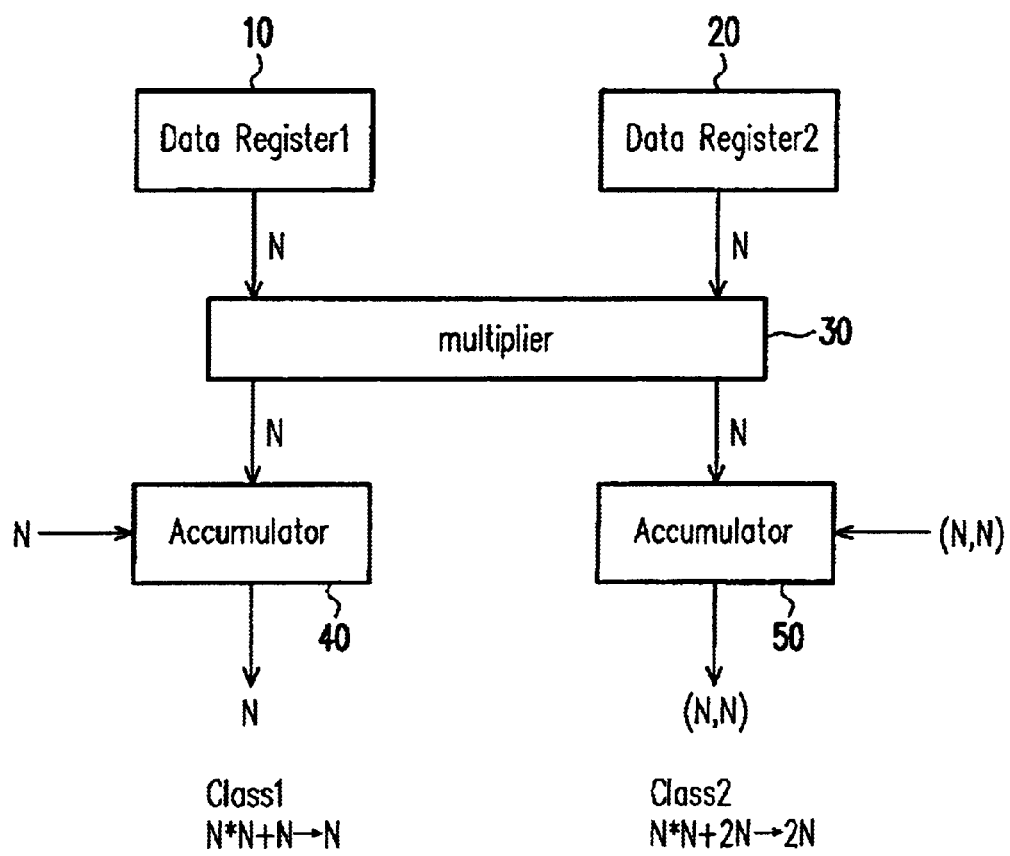
FIG. 1 is a block diagram showing a conventional multiply-accumulator unit for a data processing system.

Reference will now be made in detail to the preferred embodiments of the present invention, examples of which are illustrated in the accompanying drawings. Wherever possible, the same reference numbers am used in the drawings and the description to refer to the same or like parts.

Figure 2:
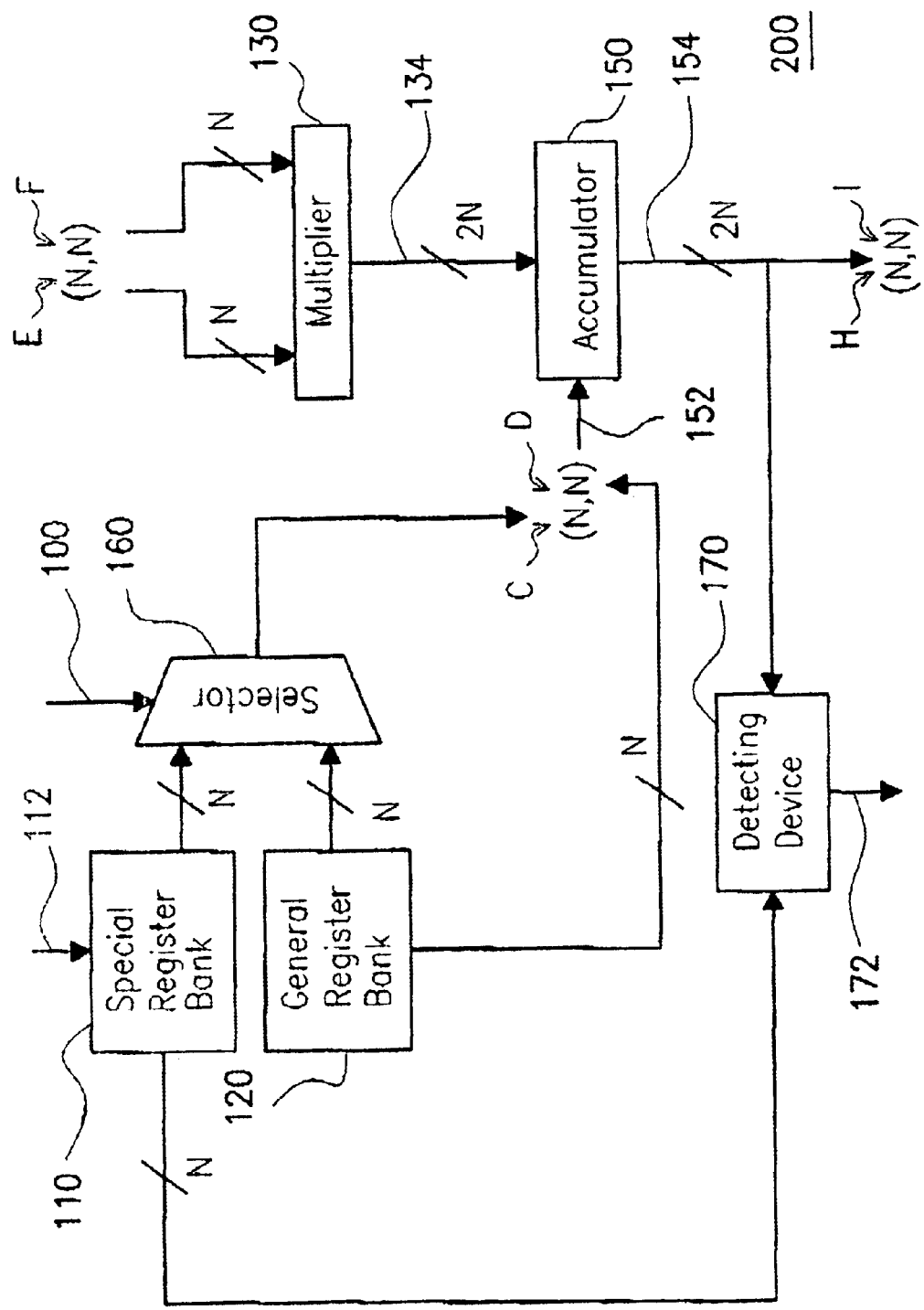
FIG. 2 is a block diagram showing a multiply-accumulator unit for a data processing system according to the present invention.

Refer to FIG. 2, which is a block diagram showing a multiply-accumulator unit 200 for a data processing system according to the present invention. The multiply-accumulator unit 200 includes a selector 160, a multiplier 130, and an accumulator 150. Data are supplied from a special register bank 110 and a general register bank 120. The multiplier 130 is coupled to the accumulator 150. The special register bank 110 and the general register bank 120 are coupled to the selector 160. The selector 160 is coupled to the accumulator 150. The general register bank 120 is also directly coupled to the accumulator 150. The multiply-accumulator unit 200 further includes a detecting device 170 coupled to the accumulator 150.

The multiplier 130 is capable of multiplying two N-bit operands and then gets a 2N-bit multiplied result 134. For example, N*N to get a 2N result. As shown in FIG. 2, a first N-bit operand denoted as E and a second N-bit operand denoted as F are inputted into the multiplier 130. A 2N-bit multiplied result 134 is generated by the multiplier 130. The multiplied result 134 from multiplier 130 is sent to the 2N-bit accumulator 150 and is added by an addition operand. The addition operand is also 2N bits including a first N-bit part and a second N-bit part. In the invention, just one accumulator is necessary to provide more desired calculations. For example, in the prior art, if two calculations such as N*N+N→N and N*N+2N42N are desired, there are at least two accumulators are necessary to provide these desired calculations. In the architecture of the invention, only one accumulator is necessary for the two calculations. The circuits as shown in FIG. 2 can implement the feature.

In the invention, a class signal 100 is provided to the selector 160 to indicate one of two different classes of instructions. The class signal 100 indicates which class of instructions is being operated on. For example, a first class of instructions such as N*N++2N→2N or a second class of instructions such as N*N+N→N. The class signal is set by a decoding instruction supplied to the multiply-accumulator unit 200. The first class of instruction needs more execution time and a more precise result is generated therefrom. The second class of instruction needs less execution time than the first class of instruction.

When the class of instructions is the first class, i.e., if the desired calculation is N*N+2N→2N, the class signal 100 causes the selector 160 to provide data from the general register bank 120 to the accumulator 150. That is, the 2N bits of the addition signal 152 includes (N, N). The first N-bit part of the addition signal 152 is denoted by C, and the second N-bit part of the addition signal 152 is denoted by D. The first N-bit part C is provided by the general register bank 120. The second N-bit part D is is also provided from the general register bank 120, as shown in FIG. 2.

When the class of instructions is the second class, i.e., N*N+N→N, the class signal 100 causes the selector 160 to provide data from the special register bank 110 to the accumulator 150. That is, the special register 110 provides the first N-bit part C of the addition operand 152. The special register bank li can be accessed by users under software control. The second N-bit part D is provided from the general register bank 120. In the multiply-accumulator unit 200 of the preferred embodiment of the invention, a 2N-bit (152) will be added by the accumulator 150 and a 2N1 bit accumulated result will be generated, no matter the calculation of N*N+N→N just needs a N-bit data to be added and a N-bit accumulated result to be generated. The architecture of the invention provides some advantages. For example, a case of overflow will be easily detected in such design. The details will be described below. Another advantage is simplifying some calculations to save execution time. For example, if a calculation such as $$\sum_{k=0}^{n} X_k Y_k = X_0 Y_0 + X_1 Y_1 + \ldots + X_n Y_n$$

is desired, the comparison between the preferred embodiment and the prior art is as followed:

In the prior art, the program language is:

```
for (k=0; k≧n; k++) {
    Move X_k to R_0
    Move Y_k to R_1
    R_2=R_0*R_1 + R_2; MLA R_2, R_0, R_1, R_2
    k=k+1
}
``` wherein the "MLA" is an instruction for N*N+N=N, the result alter executing the "MLA" instruction is 32-bit in length.

In the preferred embodiment, the program language is:

```
for (k=0; k≧n; k++) {
    Move X_k to R_0
    Move Y_k to R_1
    (R_CP, R_2)=R_0*R_1 + (R_CP, R_2); MLA R_2, R_0, R_1, R_2
    k=k+1
}
``` wherein the "MLA" is an instruction for N*N+N=N, the result after executing the "MLA" instruction in the program of the invention is 64-bit in length.

In the preferred embodiment of the invention, a result of summation is 64-bit and the prior art is 32-bit. If a 64-bit result is required in the prior art, a calculation of N*N+ 2N42N is necessary, which needs more execution time than that in the embodiment. That is, in the invention, a simplified calculation is necessary for &e same as in the prior art.

After accumulation, the accumulator 150 generates an accumulated result 154. The accumulated result 154 is 2N-bit and includes a first N-bit part H and a second N-bit part I. The accumulated result 154 will be an output result of the multiply-accumulator unit 200. The accumulated result 154 also can be outputted to a detection device 170 to detect a case of overflow, which is indicated by a detective result 172.

In such a case that the class of instructions is the second class, i.e., (calculation of N*N+N→N is desired. The detection device 170 will compare the first N-bit part H of the accumulated result 154 with the first N-bit part C of the addition operand 152, which is supplied by the special register bank 110. If the first N-bit part H of the accumulated result 154 is not the same as the first N-bit part C of the addition operand 152, it means that an overflow case is occurred in this calculation.

For clarity, the two N-bit operands that inputted into the multiplier 130 are respectively denoted as E and F. The calculation of N*N+N→N instruction can be implemented by the invention as E*F+CD→HI. In this case that C is not equal to the H, that means that an overflow occurs. The calculation of N*N+2N→N instruction can also be implemented by the same architecture of the invention as E*F+CD→HI.

For an N*N+2N→2N class instruction, the accumulator adds CD to the result of the E*F multiply operation, to get an accumulated HI result. Remembering that the accumulator only performs one type of calculation, 2N+2N→2N. For an N*N+N→N class instruction the accumulator adds CD to the result of the E*F multiply operation, to get an HI result. C, in this case, is provided by the special register bank 110. If after the addition operation H does not equal C, then there is an overflow.

This overflow indicator provides users with useful information in a quick and convenient manner whereas the multiply-accumulator unit of FIG. 1 does not provide this overflow indication. This is another advantage of the present invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An apparatus for processing data, said apparatus comprising:

A special register bank of N-bit data processing registers;

A general register bank of N-bit data processing registers;

A selector, coupled to the special register bank and the general register bank, for selecting one of the special and general register banks and outputting a selected N-bit result from the selected register bank in according to a class signal received by the selector, wherein the selected N-bit result and a N-bit data form a 2N-bit addition operand, wherein the class signal is used for indicating either a first class of instruction or a second class of instruction;

A multiplier for performing multiply operation upon a first operand and a second operand and outputting an 2N-bit multiplied result;

One accumulator, coupled to the multiplier, the selector and the general register bank, for performing accumulate operation upon the 2N-bit multiplied result and the 2N-bit addition operand and outputting a 2N-bit accumulated result.

2. The apparatus for processing data of claim 1, wherein the first class of instruction is executing a first calculation of N*N+2N→2N and the second class of instruction is executing a second calculation of N*N+N→N.

3. The apparatus for processing data of claim 2, the apparatus further comprising a detecting device, coupled to the accumulator, for receiving the 2N-bit accumulated result and for checking if a case of overflow occurs.

4. The apparatus for processing data of claim 3, wherein the outputted N-bit result from the selector and the N-bit data held in the general register bank are formed in combination as a first N-bit part and a second N-bit part of the 2N-bit addition operand, the accumulated result includes a third N-bit part and a fourth N-bit part, when the class signal is the second class of instruction, the detecting device comparing the first N-bit part of the 2N-bit addition operand and the third N-bit part of the accumulated result to determine if the case of overflow occurs.

5. The apparatus for processing data of claim 1, the apparatus further comprising a detecting device, coupled to the accumulator, for receiving the 2N-bit accumulated result and for checking if a case of overflow occurs.

6. The apparatus for processing data of claim 5, wherein the outputted N-bit result from the selector and the N-bit data are formed in combination as a first N-bit part and a second N-bit part of the 2N-bit addition operand, the accumulated result includes a third N-bit part and a fourth N-bit part, when the class signal is the second class of instruction, the detecting device comparing the first N-bit part of the 2N-bit addition operand and the third N-bit part of the accumulated result to determine if the case of overflow occurs.

7. A method for processing data using an apparatus having a special resister bank of N-bit data processing registers, a general register bank of N-bit data processing registers, a selector, a multiplier and an accumulator, the method comprising:

selecting one of the special and general register banks and outputting a N-bit result from the selected register bank in according to a class signal received by the selector, wherein the N-bit result and a N-bit data form a 2N-bit addition operand, where the class signal is used for indicating a first class of instruction or a second class of instruction;

performing multiply operation upon a first operand and a second operand and outputting an 2N-bit multiplied result, and performing accumulate operation upon the 2N-bit multiplied result and the 2N-bit addition operand by one accumulator and outputting a 2N-bit accumulated result.

8. The method for processing data of claim 7, wherein the first class of instruction is executing a fist calculation of N*N+2N→2N and the second class of instruction is executing a second calculation of N*N+N→N.

9. The method for processing data of claim 8, further comprising a step of receiving the 2N-bit accumulated result and checking if a case of overflow occurs.

10. The method for processing data of claim 9, wherein
- the outputted N-bit result from the selector and the N-bit data held in the general register bank are formed in combination as a first N-bit part and a second N-bit part of the 2N-bit addition operand,
- the accumulated result includes a third N-bit part and a fourth N-bit part,
- when the class signal is the second class of instruction, comparing the first N-bit part of the 2N-bit addition operand and the third N-bit part of the accumulated result to determine if the case of overflow occurs.

11. The method for processing data of claim 7, further comprising a step of receiving the 2N-bit accumulated result and checking if a case of overflow occurs.

12. The method for processing data of claim 11, wherein
- the outputted N-bit result from the selector and the N-bit data are formed in combination as a first N-bit part and a second N-bit part of the 2N-bit addition operand,
- the accumulated result includes a third N-bit part and a fourth N-bit part,
- when the class signal is the second class of instruction, comparing the first N-bit part of the 2N-bit addition operand and the third N-bit part of the accumulated result to determine if the case of overflow occurs.

13. An apparatus for processing data, said apparatus consisting of:
- A special register bank of N-bit data processing registers;
- A general register bank of N-bit data processing registers;
- A selector, coupled to the special register bank and the general register bank, for selecting one of the special and general register banks and outputting a selected N-bit result from the selected register bank in according to a class signal received by the selector, wherein the selected N-bit result and a N-bit data form a 2N-bit addition operand, wherein the class signal is used for indicating either a first class of instruction or a second class of instruction;
- A multiplier for performing multiply operation upon a first operand and a second operand and outputting an 2N-bit multiplied result;
- An accumulator, coupled to the multiplier, the selector and the general register bank, for performing accumulate operation upon the 2N-bit multiplied result and the 2N-bit addition operand and outputting a 2N-bit accumulated result,
- A detecting device, coupled to the accumulator, for receiving the 2N-bit accumulated result and for checking if a case of overflow occurs.

14. The apparatus for processing data of claim 13, wherein
- the outputted N-bit result from the selector and the N-bit data held in the general register bank are formed in combination as a first N-bit part and a second N-bit part of the 2N-bit addition operand,
- the accumulated result includes a third N-bit part and a forth N-bit part,
- when the class signal is the second class of instruction, the detecting device comparing the first N-bit part of the 2N-bit addition operand and the third N-bit part of the accumulated result to determine if the case of overflow occurs.

* * * * *